Nov. 8, 1927.
J. B. HOWER ET AL
1,648,731
LIQUID GAUGE
Filed March 5, 1923
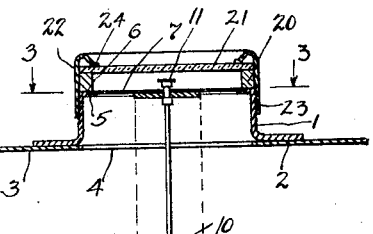
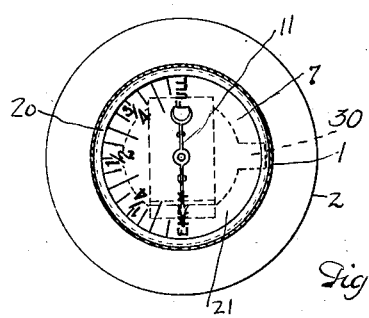
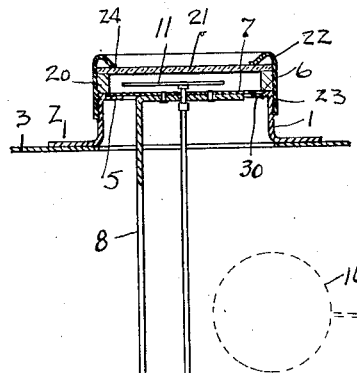
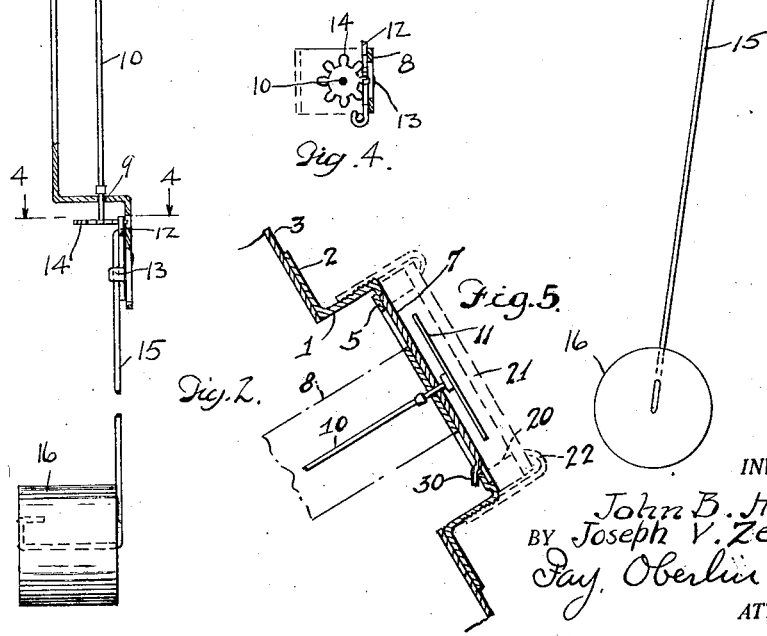
INVENTORS
John B. Hower
BY Joseph V. Zeller
Fay, Oberlin & Fay
ATTORNEYS Patented Nov. 8, 1927.

1,648,731

UNITED STATES PATENT OFFICE.

JOHN B. HOWER AND JOSEPH V. ZELLER, OF AKRON, OHIO, ASSIGNORS TO THE AKRON-SELLE COMPANY, OF AKRON, OHIO, A CORPORATION OF OHIO.

LIQUID GAUGE.

Application filed March 5, 1923. Serial No. 622,737.

The present invention, relating, as indicated, to liquid gauges, is particularly directed to an improved type of gauge for use in liquid containing tanks of all types, the principal object of the invention being the provision of an improved and simplified type of head for such a gauge. To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing:—

Fig. 1 is a side elevation partially in section showing our improved gauge in position in the tank; Fig. 2 is a similar view but taken from a point 90 degrees around from the first view; Fig. 3 is a section on the line 3—3 in Fig. 1; Fig. 4 is a section on the line 4—4 in Fig. 2; and Fig. 5 is an enlarged sectional detail view.

Our improved gauge consists of a head 1 which is of open tubular form and is provided with a flange 2, adapted to be mounted against the metal top 3 of a tank or a liquid reservoir in position about an opening 4 therein. The head 1 is provided with an inwardly directed flange 5, which has a recess 6 in its upper surface adapted to receive a dial plate 7, the dial plate being graduated as shown in Fig. 3. The dial plate is held against tilting with respect to the flange 5 by a stamped-out lug 30 which engages beneath the flange 5. The dial plate 7 is in the form of stamped metal disk and carries a support 8 which extends downwardly into the tank 3 where it is formed with an opening 9 adapted to rotatably support therein a shaft 10. This shaft 10 carries an indicating hand 11 on its upper end above the dial. The support 8 carries on its lower end a sprocket or gear 12 which is rotatably mounted upon a stud 13, and meshes with a gear or sprocket 14, on the lower end of the shaft 10. Attached to the sprocket 12 is a rod 15 carrying a float 16, and as this float is raised from its lowest position, shown in Fig. 1, by the rising level of the liquid in the tank in which the gauge is mounted, it rotates the shaft 10 and swings the indicating hand 11 over the dial between the empty and full positions which are marked thereon.

Above the dial plate 7 is mounted a washer 20 of suitable compressible material, this washer resting against both the dial plate and the upper surface of the flange 5 on the head. The dial plate is inset in the recess in the flange and is flush with the upper surface thereof so that a single washer 20 may be used for retaining the dial in the recess. On top of the dial is mounted a transparent disk or plate 21, while the dial, washer and plate are maintained in this arrangement by means of a cap 22 which is internally threaded to engage against external threading 23 on the head. The cap is also provided with an inturned flange 24 which engages against the upper surface of the plate 21. The inturned flange 24 on the cap 22 is machined on its lower or bottom face to a perfectly smooth, even surface for contact against the glass disk 21. The mounting of the glass disk upon a compressible washer 20 and the use of this smooth-machined engaging surface on the flange 24 makes it unnecessary to use a second packing washer between the cap and the glass, and in that way facilitates the assembly of the device and slightly lowers the cost.

The entire operating mechanism in the present gauge is suspended from a dial plate which is mounted directly upon the head of the device without the use of the usual sealing plate upon which the mechanism is ordinarily supported. The dial is of sufficient strength to adequately support the operating mechanism, which is extremely light, and the construction in the head is such that this dial plate is securely held to steadily support the operating mechanism, and at the same time prevent the leakage of liquid around the edges of the dial even though no sealing plate is used.

Other modes of applying the principle of our invention may be employed instead of the one explained, change being made as regards the mechanism herein disclosed, provided the means stated by the following claim or the equivalent of such stated means be employed.

We therefore particularly point out and distinctly claim as our invention:—

In a device of the character described, the combination of a tubular head having external threads thereon and provided with an internal flange having a recess in its upper surface, a dial plate seated against the upper face of said flange, a stamped-out lug on one side of said dial plate to engage beneath said internal flange to prevent tilting of said plate and its associated mechanism, an indicating hand, a shaft connected to and supporting said hand in spaced relation to the upper side of said dial plate and having a bearing in said plate, a pressed metal supporting member secured to the under side of said dial plate and extending downwardly therefrom, said member being angularly bent adjacent its lower end to form a second bearing for said shaft, said lower end of said member being bent at right angles to said angular portion, a segmental gear pivoted to said lower end, a gear mounted on the lower end of said shaft and engaging said segmental gear, and a float arm connected with said segmental gear, and adapted to rotate said shaft and indicating hand through said interengaged gears.

Signed by us, this 19 day of February, 1923.

JOHN B. HOWER.
JOSEPH V. ZELLER.